(12) United States Patent
Nagamine et al.

(10) Patent No.: US 7,800,682 B2
(45) Date of Patent: Sep. 21, 2010

(54) PORTABLE TERMINAL AND PORTABLE TELEPHONE HAVING A CAMERA AND LENS COVER

(75) Inventors: Tomoyuki Nagamine, Kanagawa (JP); Kazunori Katou, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 12/149,619

(22) Filed: May 6, 2008

(65) Prior Publication Data

US 2008/0220817 A1 Sep. 11, 2008

Related U.S. Application Data

(63) Continuation of application No. 10/359,233, filed on Feb. 6, 2003, now Pat. No. 7,414,659.

(30) Foreign Application Priority Data

Aug. 30, 2002 (JP) .............................. 2002-253449

(51) Int. Cl.
*H04N 5/225* (2006.01)
*G02B 23/16* (2006.01)
*G03B 17/00* (2006.01)

(52) U.S. Cl. ..................... 348/335; 359/511; 396/448

(58) Field of Classification Search ................. 396/448; 359/511; 348/335, 360, 373–375
See application file for complete search history.

(56) References Cited

U.S. PATENT DOCUMENTS

| 1,992,068 | A | | 2/1935 | Gwozdecki |
| 2,778,273 | A | | 1/1957 | Fellmeth |
| 3,480,350 | A | | 11/1969 | Hamby |
| 4,906,513 | A | | 3/1990 | Kebbell et al. |
| 5,402,171 | A | | 3/1995 | Tagami et al. |
| 5,710,692 | A | * | 1/1998 | Muck et al. .................. 361/212 |
| 6,731,952 | B2 | * | 5/2004 | Schaeffer et al. ............ 455/557 |
| 2002/0013161 | A1 | * | 1/2002 | Schaeffer et al. ............ 455/557 |

FOREIGN PATENT DOCUMENTS

| JP | 06-130561 | | 5/1994 |
| JP | 06303471 A | | 10/1994 |
| JP | 07064152 A | * | 3/1995 |
| JP | 07-178039 | | 7/1995 |

(Continued)

OTHER PUBLICATIONS

English Language Abstract for JP 07-064152 A, Abe, Oct. 3, 1995.*
Machine Translation of JP 07-064152 A, Abe, Oct. 3, 1995.*

(Continued)

*Primary Examiner*—David L Ometz
*Assistant Examiner*—Dillon Durnford-Geszvain
(74) *Attorney, Agent, or Firm*—Westerman, Hattori, Daniels & Adrian, LLP

(57) ABSTRACT

In a portable terminal having a photographic function for receiving photographic light from a camera subject and obtaining image data, the portable terminal comprises an optical member receiving photographic light from the camera subject, and a cover member mounted on a slidable basis. The cover member selectively opens and shuts to cover said optical member in accordance with a sliding operation. The cover member has a mirror on a surface of the cover member.

2 Claims, 13 Drawing Sheets

FOREIGN PATENT DOCUMENTS

| | | |
|---|---|---|
| JP | 10-268386 | 10/1998 |
| JP | 3064740 | 9/1999 |
| JP | 2001-109111 | 4/2001 |
| JP | 2001-309003 | 11/2001 |

OTHER PUBLICATIONS

Office Action from the Japanese Patent Office dated Apr. 13, 2007 in the corresponding Japanese Patent Application No. 2002-253449.

Machine translation of JP 06303471A, Oct. 1994.

* cited by examiner

PORTABLE TERMINAL AND PORTABLE TELEPHONE HAVING A CAMERA AND LENS COVER

This application is a continuation application of U.S. Ser. No. 10/359,233, filed Feb. 6, 2003, which claims priority of Japanese Patent Application No. 2002-253449 filed on Aug. 30, 2002, which is hereby incorporated by reference in its entirety.

BACKGROUND OF THE INVENTION

1. Field of the Invention

The present invention relates to a portable terminal and a portable telephone, which have a photographic function for receiving photographic light from a camera subject and obtaining image data.

2. Description of the Related Art

Recently, as computer technology advances, portable terminals come into wide use. Of the portable terminals, a portable telephone and a PHS (Personal Handyphone System), (which will be referred to as portable telephones, hereinafter), for performing a radio communication between those and a base station explosively come into wide use. As a popular machine type of the present portable telephones, there is raised a machine type incorporating thereinto a camera.

By the way, Japanese Patent Publication TokuKai. 1998-268386 discloses a camera having a mirror for oneself photography. On the other hand, also in a portable telephone incorporating thereinto a camera there is known a portable telephone having a mirror for oneself photography.

FIG. 1 is a perspective view of the conventional portable telephone incorporating a camera.

A portable telephone 9 shown in FIG. 1 is a folding type of telephone folding up. The portable telephone 9 shown in FIG. 1 incorporates thereinto a camera. A transparent camera panel covers a photographic lens of the camera. The photographic lens is not illustrated in FIG. 1. FIG. 1 shows the portable telephone 9 in a state that it folds. On a surface of the portable telephone 9 in this state, there are provided an antenna 91 for communications, apertures 92 from which a terminating sound emanates, a sub-display 93 provided in addition to a main display (not illustrated), the above-mentioned transparent camera panel, or a camera panel 94, and a mirror 95 for oneself photography provided in the vicinity of the camera panel 94. To take a picture of one's own face by oneself using such a portable telephone 9, an operator has the portable telephone 9 at the ready in such a manner that the photographic lens turns toward oneself, confirms composition of a photograph in view of the mirror image reflected in the mirror 95, and depresses a shutter button (not illustrated). Then, an image representative of one's own face at the time of the depression of the shutter button is taken into the portable telephone 9 in form of image data.

However, sticking of stains such as dust and fingerprints to the camera panel 94 covering the photographic lens makes it difficult to take a clear picture, even in the event that a picture of any thing including one's own face is taken. The camera panel 94 of the portable telephone 9 shown in FIG. 1 is always exposed, and thus it is easy that a stain sticks to the camera panel 94. For this reason, when a user operates the portable telephone 9 shown in FIG. 1, the user has to take a care so that no stain sticks to the camera panel 94. Thus, the operability is lowered. Further, there is a possibility that a stain sticks to the camera panel 94 at the time of carrying and keeping. For this reason, it may happen that prior to starting the photographic operation a work to remove a stain sticking to the camera panel 94 has to be performed. This work also makes the operability to be lowered.

Further, the wide use of such a portable telephone with a camera makes it possible for anyone to easily take a picture around. On the other hand, it is difficult for those around one to determine whether an operator of the portable telephone performs a photographic operation or another operation. In the event that the operator happens to operate the portable telephone in a telephone mode turning toward a person, there is a possibility of arousing the person's suspicion about sneakingly taking a shot of the person.

Japanese Patent Publication TokuKai. 2001-309003 discloses a portable telephone with a camera having a cover member covering a photographic lens, which cover member opens and shuts selectively. The portable telephone disclosed in Japanese Patent Publication TokuKai. 2001-309003 has no camera panel for covering a photographic lens. The photographic lens is disposed at the closest one to the camera subject side, of parts of a photographic optical system of the portable telephone. Here, the one disposed closest to the camera subject side, of parts of the photographic optical system, is referred to as an optical member. According to the portable telephone disclosed in this Japanese Patent Publication, a cover member can cover the optical member at the time of nonuse of the camera. Thus, a possibility that a stain sticks to the optical member is reduced. Further, covering the optical member by the cover member removes arousing one's suspicion about a candid shot.

However, the portable telephone disclosed in Japanese Patent Publication TokuKai. 2001-309003 is not provided with the mirror 95 as shown in FIG. 1. On the other hand, Japanese Utility Model Registration No. 3064740 discloses a portable telephone with no camera having a mirror and a cover for covering the mirror, which cover opens and shuts selectively.

In view of the above, it is considered that technology of the cover member disclosed in Japanese Patent Publication TokuKai. 2001-309003 is applied to the portable telephone 9 shown in FIG. 1. By the way, it is preferable that the mirror for oneself photography is disposed in the vicinity of an optical member as much as possible in order to reduce a discrepancy in one's eye at the time of oneself photography as much as possible. According to the portable telephone 9 shown in FIG. 1, the mirror 95 is disposed in the vicinity of the optical member. Thus, when it is intended that technology of the cover member disclosed in Japanese Patent Publication TokuKai. 2001-309003 is applied to the portable telephone 9 shown in FIG. 1, there occurs necessity that an open and shut mechanism for a cover member is arranged with a specific mechanism in such a manner that when the cover member is opened it is prevented that the cover member covers the mirror. This brings about degradation of operability of an open and shut operation of the cover member.

Provision of the cover member makes it possible to prevent a stain from sticking to the optical member when the cover member covers the optical member. This may improve the operability of the open and shut operation of the cover member. However, regardless of the existence of the mirror, even if the cover member is provided on a portable telephone with a camera, the optical member exposes at the time of photography. Thus, there remains a possibility that a stain sticks to the optical member. For this reason, there is obliged such a work that prior to the start of the photographic operation a stain sticking to the optical member is removed, which work involves degradation of operability.

SUMMARY OF THE INVENTION

In view of the foregoing, it is an object of the present invention to provide a portable terminal having a photographic function improved in operability, and a portable telephone having a photographic function improved in operability.

To achieve the above-mentioned object, the present invention provides a portable terminal of three types, any types of portable terminal having a photographic function for receiving photographic light from a camera subject and obtaining image data, said portable terminal comprising:

an optical member receiving photographic light from the camera subject; and a cover member mounted on a slidable basis, said cover member selectively opening and shutting to cover said optical member in accordance with a sliding operation.

The optical member referenced above is one disposed at the place closest to the camera subject side of parts of a photographic optical system, and specifically, for example, a photographic lens and a transparent lens cover disposed in front of the photographic lens. But, it is not restricted to those items.

According to any type of portable terminal of the present invention, when a photographic operation is not performed, shutting the cover member makes it possible to prevent a stain from sticking to the optical member.

There will be explained three types of portable terminal hereinafter.

First, a first portable terminal as a first type is characterized in that the cover member has a mirror on a surface of said cover member.

According to the first portable terminal of the present invention, the portable terminal is provided with the mirror, which is disposed on the surface of said cover member. Thus, the open and shut operation for the cover member is performed by a sliding operation, which will be easy for any person, without interference between the cover member and the mirror. Accordingly, it is possible to expect an excellent operability in open and shut of the cover member.

In the first portable terminal according to the present invention as mentioned above, it is acceptable that said mirror comprises a first mirror section reflecting a predetermined first area, and a second mirror section reflecting a predetermined second area surrounding the first area. Further, it is preferable that said second mirror section is disposed on a periphery of said first mirror section as a concentric circle.

It is acceptable that the second mirror section reflects the first area together with the second area. The second mirror section is disposed at the side of first mirror section. On the other hand, in the type in which the second mirror section is disposed on a periphery of said first mirror section as a concentric circle, the second mirror section serves as the first mirror section. This feature contributes to a compactness of the portable terminal.

In the first portable terminal according to the present invention as mentioned above, it is preferable that said portable terminal obtains image data representative of a camera subject image of an angle of photographic field optionally selected from among a plurality of mutually different angles of photographic field, said first mirror section reflects a camera subject of a minimum angle of photographic field of the plurality of angles of photographic field, and said second mirror section reflects a camera subject of a maximum angle of photographic field of the plurality of angles of photographic field.

Further it is preferable that said portable terminal causes a photographic light received from the camera subject to form on an imaging plane of an imaging device in which a plurality of photo-electric elements are arranged on a two-dimensional basis, and obtains image data of a number of pixels corresponding to a number of photo-electric elements in an area optionally selected from among a plurality of areas of the imaging plane, the plurality of areas being mutually different in number of photo-electric elements, said first mirror section reflects a camera subject wherein the camera subject image is represented by image data of a first number of pixels, and said second mirror section reflects a camera subject wherein the camera subject image is represented by image data of a second number of pixels, the second number of pixels being different from the first number of pixels.

According to a portable terminal having digital or optical zoom function, varying a zoom magnification varies an angle of photographic field. In other words, varying a zoom magnification varies a photographic range. Further, according to a portable terminal obtaining image data in accordance with a plurality of standards mutually different from one another in designation of the number of pixels, varying the standards varies a photographic range. In other words, varying the number of pixels varies a photographic range. According to the former portable terminal provided with the mirror section according to an angle of photographic field, even if the zoom magnification is varied, it is possible to reflect a suitable photographic range on the mirror. Further, according to the later portable terminal provided with the mirror section according to the number of pixels, even if the number of pixels is varied, it is possible to reflect a suitable photographic range on the mirror. Thus, in any portable terminals, it is possible to reduce the number of times of taking photograph over again in oneself photography.

A second portable terminal as a second type is characterized in that said cover member has a static eliminating member facing said optical member when said cover member is shut.

A third portable terminal as a third type is characterized in that said cover member has a wiping up member wiping up a stain of said optical member when said cover member slidably moves.

According to the second portable terminal, whenever the cover member is shut, the optical member is statically eliminated, and thus it is possible to prevent a stain from sticking to the optical member. Further according to the third portable terminal, whenever the cover member is opened and shut, the wiping up member wipes up a stain sticking to the optical member. Thus, in any types of portable terminal, there is no need to perform a work of wiping up a stain sticking to a camera panel prior to starting a photographic operation. And thus operability is improved.

Structure of the characteristic portions of a portable telephone of the present invention is the same as structure of the characteristic portions of the first portable telephone as mentioned above, excepting that the above-mentioned mirror is a mirror for oneself photography. Thus, a first portable telephone of the present invention has the same operational effect as the first portable terminal of the present invention.

Also in the first portable telephone, it is acceptable that the mirror for oneself photography comprises a first mirror section reflecting a predetermined first area, and a second mirror section reflecting a predetermined second area surrounding the first area.

DETAILED DESCRIPTION OF PREFERRED EMBODIMENTS

Hereinafter, there will be explained a portable telephone by way of example of an embodiment of a portable terminal. It is noted that the portable telephone raised here by way of example corresponds to an embodiment of a portable telephone of the present invention.

Embodiments of the present invention will be described with reference to the accompanying drawings.

Figure 2:
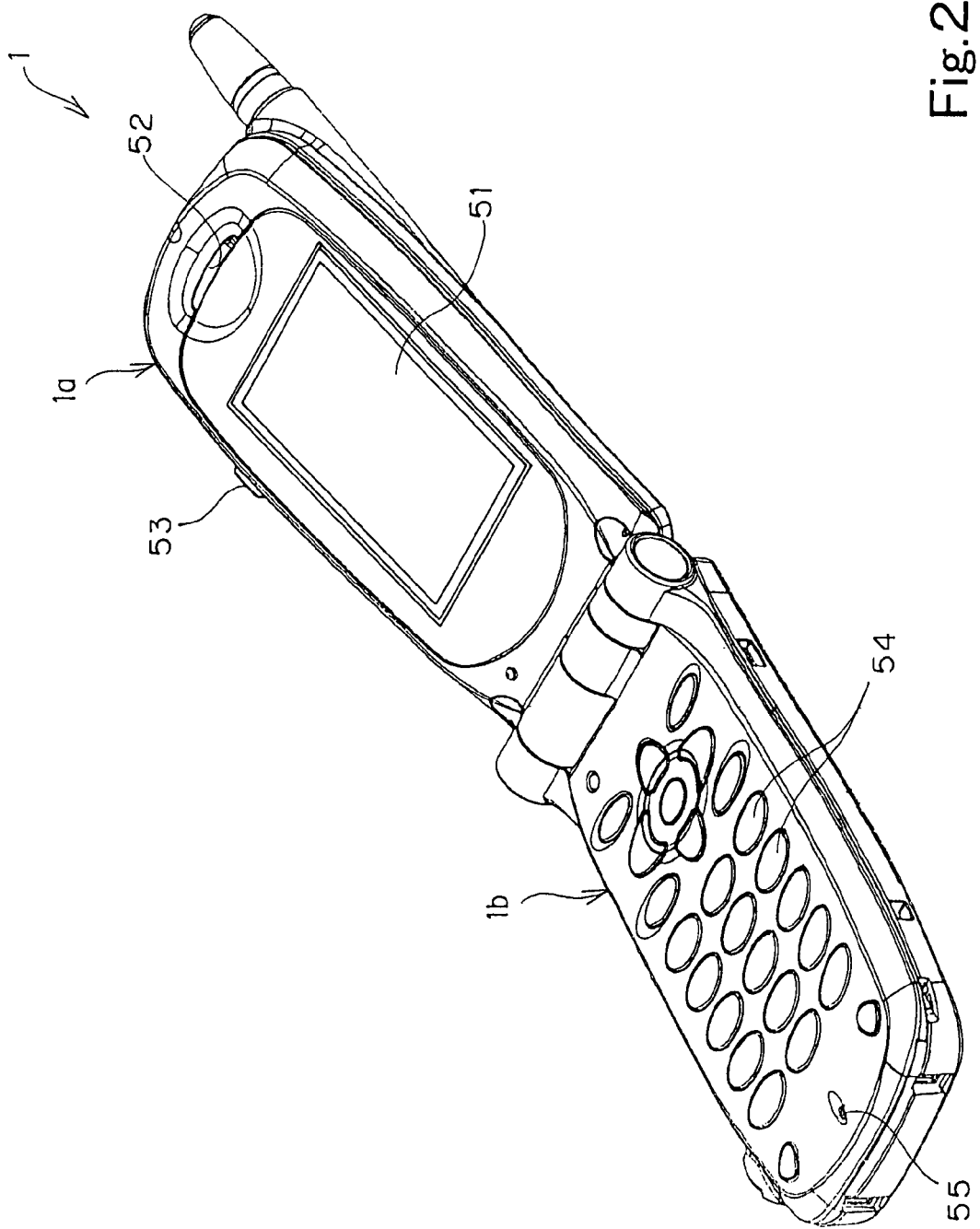
FIG. 2 is a perspective view of a portable telephone according to the present embodiment.

FIG. 2 is a perspective view of a portable telephone according to the present embodiment.

A portable telephone 1 shown in FIG. 2 is a folding type of portable telephone folding up. On one of two folding portions of the portable telephone 1, there are provided a main display 51 for displaying telephone numbers and other various sorts of information, and in addition an aperture 52 through which a phonetic sound generated from an inside receiving speaker emanates toward the outside. The portable telephone 1 shown in FIG. 2 incorporates therein a camera. The portable telephone 1 has a photographic function for receiving photographic light from a camera subject and obtaining image data. The main display 51 can display not only the telephone numbers but also a photograph photographed by the camera incorporated into the portable telephone 1. Hereinafter, one portion of the two folding portions, on which the main display 51 is disposed, is referred to as a display side 1a. On a side of the display side 1a, there is provided a shutter button 53 of the camera incorporated into the portable telephone 1.

On another portion of the two folding portions, there are provided operational buttons 54 for entering telephone numbers and other sorts of information and in addition an aperture 55 for transmitting a voice to an inside transmitting microphone. Hereinafter, another portion of the two folding portions, on which the operational buttons 54 is disposed, is referred to as an operational button side 1b.

Figure 3:
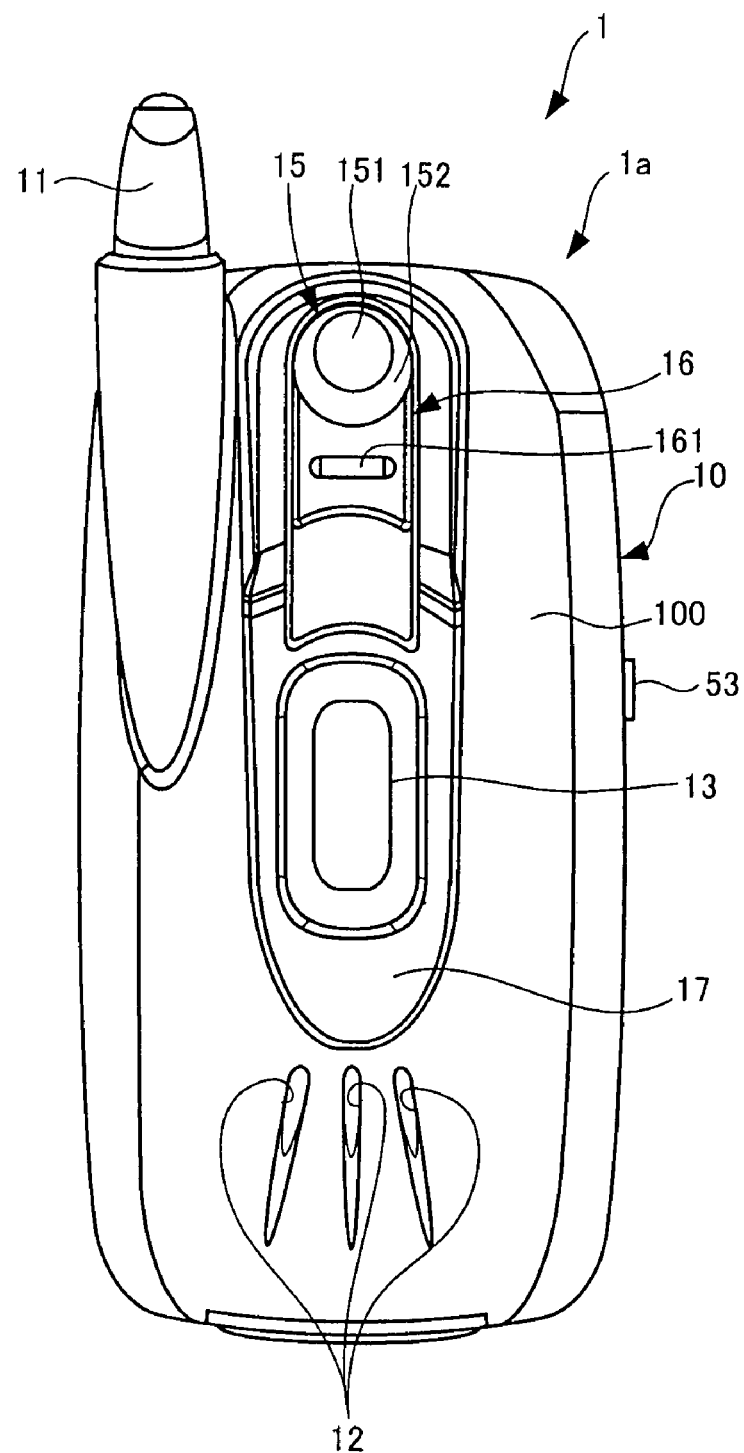
FIG. 3 is a top plan view of the portable telephone shown in FIG. 2 in a state that it is folded, looking it from the top of the display side.

FIG. 3 is a top plan view of the portable telephone shown in FIG. 2 in a state that it is folded, looking it from the top of the display side.

Inside the display side 1a, there is provided a solid state imaging device (not illustrated in FIG. 3). The solid state imaging device is covered by a case which forms an exterior surface of the display side 1a. FIG. 3 shows a rear case 10 that is a part of the exterior surface of the display side 1a. The solid state imaging device is disposed inside the rear case 10. A photographic lens is disposed in front of the solid state imaging device. The solid state imaging device has an imaging plane in which a plurality of photo-electric elements are arranged on a two-dimensional basis. A transparent camera panel covers the solid state imaging device. The solid state imaging device is not illustrated in FIG. 3. The portable telephone 1 shown in FIG. 3 is provided with a lens cover 16 for covering a camera panel, which lens cover opens and shuts selectively. FIG. 3 shows the portable telephone 1 in a state that the lens cover 16 is closed. In FIG. 3, the lens cover 16 covers the camera panel.

In conjunction with FIG. 3 and FIG. 4, there will be explained the rear case 10 of the portable telephone 1 shown in FIG. 3.

Figure 4:
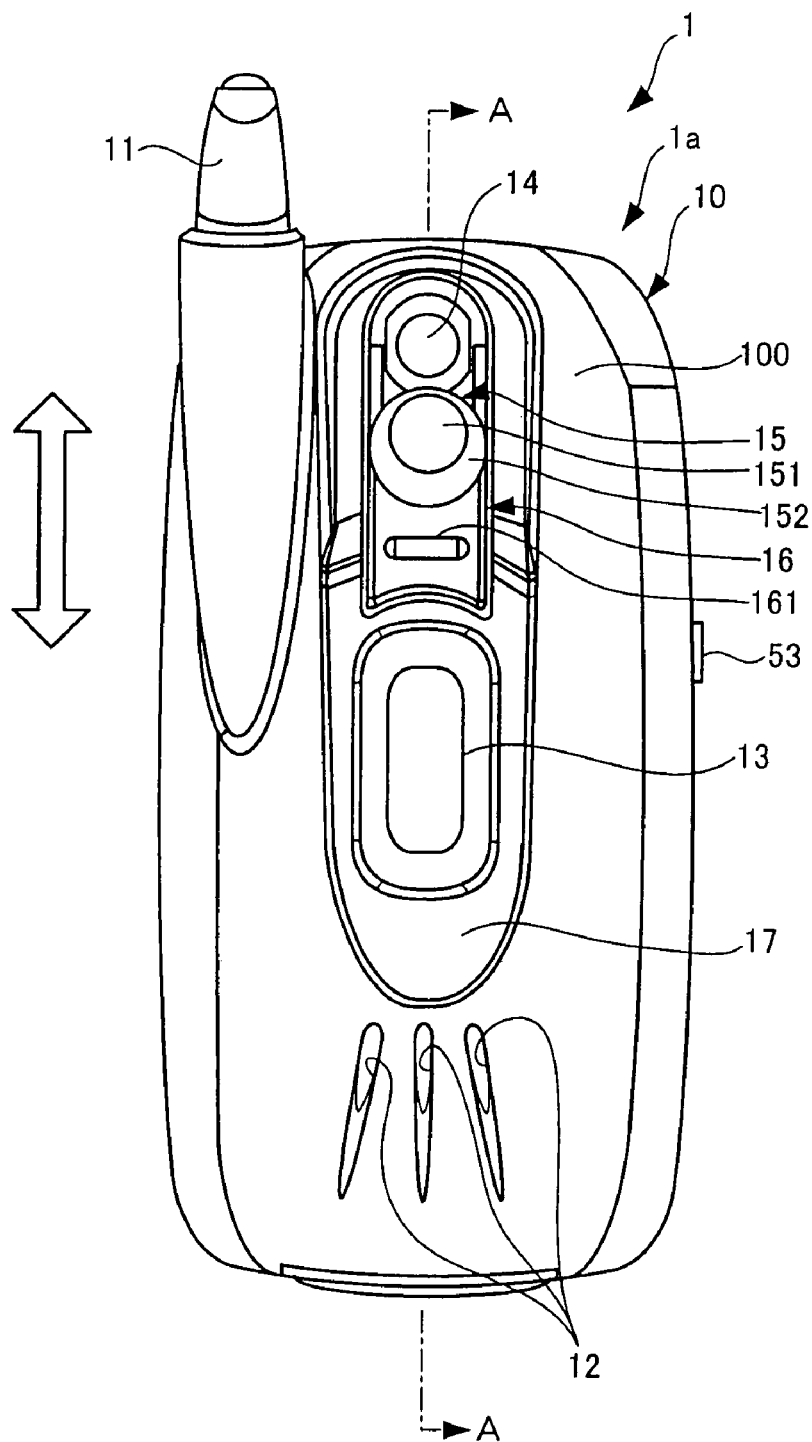
FIG. 4 is a perspective view of the portable telephone shown in FIG. 3 in a state that a lens cover is opened.

FIG. 4 is a perspective view of the portable telephone shown in FIG. 3 in a state that a lens cover is opened.

Figure 1:
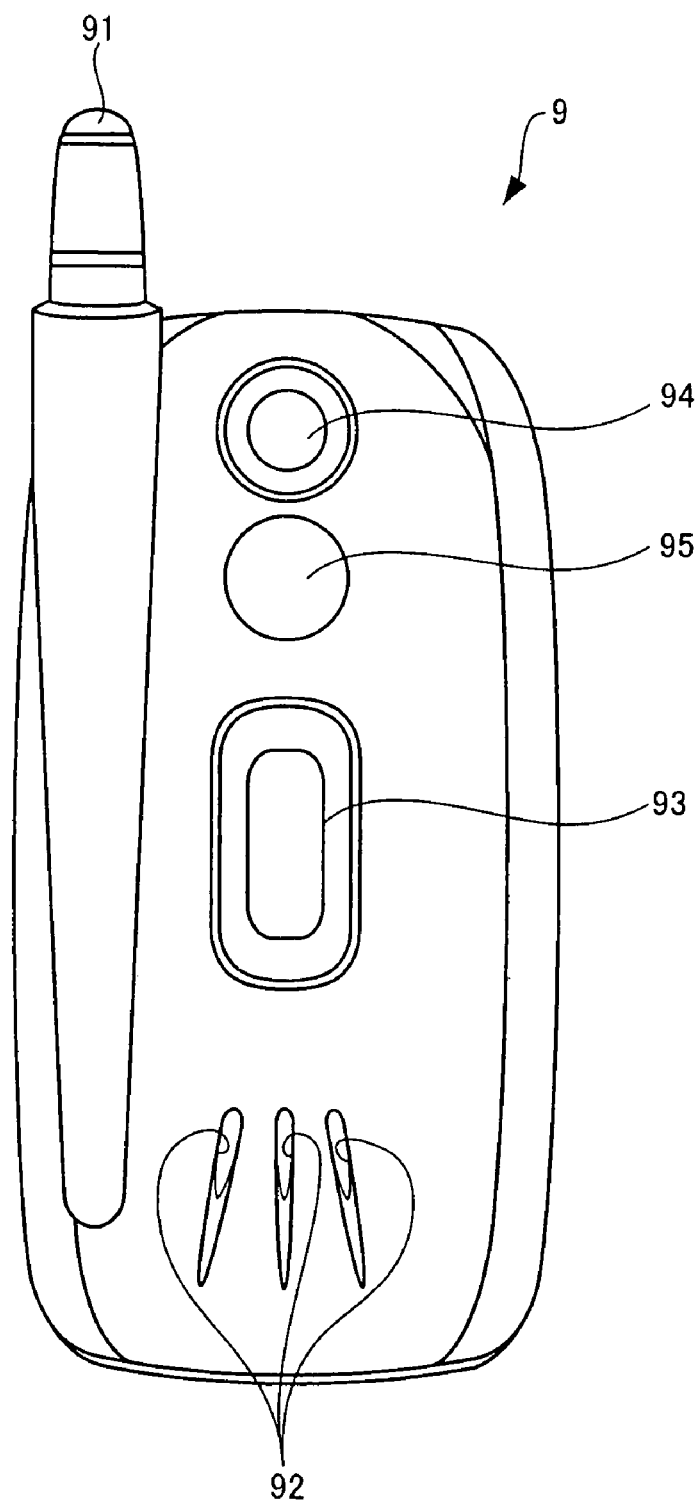
FIG. 1 is a perspective view of a conventional portable telephone including a camera.

The rear case 10 of the portable telephone 1 stores an elastic communicating antenna 11 in a state of shrinking. The rear case 10 is provided with apertures 12 through which a terminating sound generated from an inside terminating sound speaker emanates; a sub-display 13 provided in addition to the main display 51 shown in FIG. 2; the above-mentioned camera panel 14 (cf. FIG. 4); and the lens cover 16. While the photographic lens is not illustrated in FIG. 4 too, the photographic lens is disposed behind the camera panel 14. The camera panel 14 protects the photographic lens. According to the portable telephone 1 shown in FIG. 3, photographic light from the camera subject is received through the camera panel 14. The photographic lens causes the photographic light received through the camera panel 14 to form on a photographic plane of the solid state imaging device (not illustrated). Accordingly, in the portable telephone 1 shown in FIG. 3, the camera panel 14 shown in FIG. 4 corresponds to the optical member referred to in the present invention. On the other hand, in the portable telephone in which the photographic lens omitted in such a camera panel appears on a surface of the rear case 10, the photographic lens corresponds to the optical member referred to in the present invention. The lens cover 16 is mounted on a rear case surface 100 on a slidable basis, so that the lens cover 16 covers the camera panel 14 in accordance with a sliding operation, which the lens cover 16 opens and shuts selectively (cf. an arrow shown in FIG. 4). It is sufficient for switching of the lens cover 16 to simply perform the sliding operation. It is an easy way for anybody to perform the switching operation of the lens cover 16. When the lens cover 16 is closed as shown in FIG. 2, the camera panel 14 and the photographic lens disposed behind the camera panel 14 are completely covered by the lens cover 16, so that the photographic light from the camera subject is blocked off. Thus, in the event that the photographic operation is not performed, closing of the lens cover 16 makes it possible to prevent a stain from sticking to the camera panel 14. On a surface of the lens cover 16, there is provided a mirror 15 for oneself photography. The mirror 15 has a circular portion 151 reflecting a predetermined area of an angle of photographic field. To take a picture of one's own face by oneself using such a portable telephone 1, first, an operator sets up the lens cover 16 into the open state shown in FIG. 4. Then the operator has the portable telephone 1 at the ready in such a manner that the photographic lens turns toward oneself, confirms composition of a photograph in view of the mirror image reflected in the circular portion 151 of the mirror 15, and depresses a shutter button 53 provided at the side of the display side 1a. Then, an image representative of one's own face at the time of the depression of the shutter button is taken into the portable telephone 1 in form of image data. According to the portable telephone 1 shown in FIG. 2, the mirror 15 for oneself photography is provided on the surface of the lens cover 16. Thus, as compared with the conventional portable telephone 9 shown in FIG. 1, in which the mirror 95 for oneself photography is directly mounted on the rear case surface 100, it is permitted to dispose the mirror nearer the photographic lens at the time when the oneself photography is performed, and thus it is possible to suppress a discrepancy in one's eye. Further, according to the portable telephone 1 shown in FIG. 2, it is possible to provide a fine design of the rear case surface 100. In the event that an operator performs the switching operation of the lens cover 16 through holding one's finger to the circular portion 151, the circular portion 151 is stained with a one's fingerprint, and as a result the predetermined area within an angle of photographic field is not clearly projected on the circular portion 151. For this reason, there is provided a projection section 161, as a mark for a position of holding one's finger at the time of the switching operation of the lens cover 16, below the mirror 15 on the lens cover 16 of the portable telephone 1. In order to prevent an operator's finger from erroneously touching the circular portion 151 at the time of the switching operation of the lens cover 16, there are provided a circular projection section 152 higher than the circular portion 151 on the periphery of the circular portion 151. The circular projection section 152 prevents a stain from sticking to the circular portion 151 at the time of carrying and keeping of the portable telephone 1. The rear case 10 of the portable telephone 1 is provided with a rear panel 17.

Next, there will be explained in detail structural members mounted on the rear case 10 of the portable telephone 1 shown in FIG. 2 in conjunction with FIG. 5.

Figure 5:
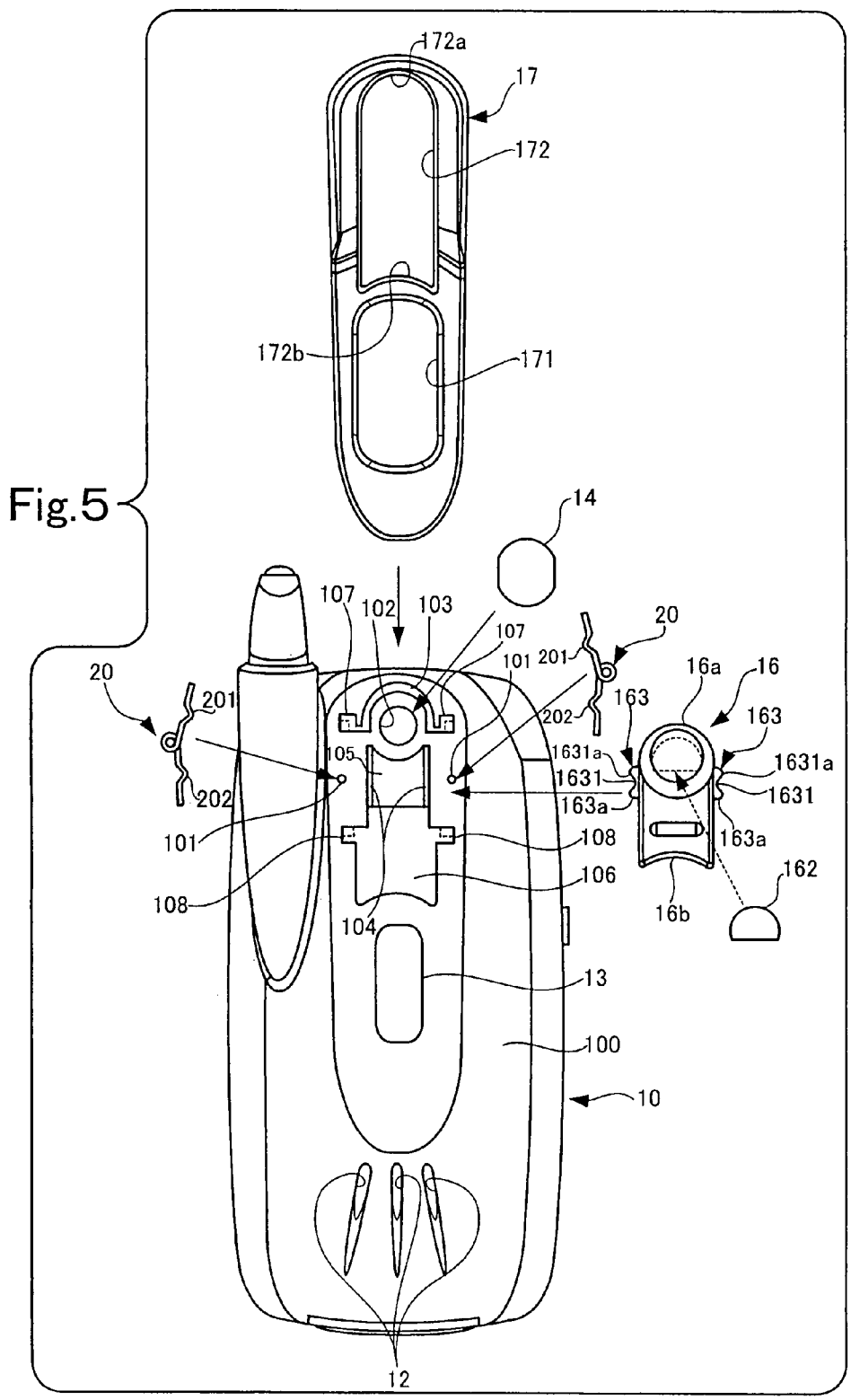
FIG. 5 is a view showing structural members mounted on a rear case surface of the portable telephone shown in FIG. 2.

FIG. 5 is a view showing structural members mounted on the rear case surface of the portable telephone shown in FIG. 2.

Arrows of straight lines indicated by solid lines in FIG. 5 represent that the associated structural members are to be mounted on the rear case 10. The rear panel 17 is provided with a window 171 for the sub-display and an opening 172 for the lens cover. The window 171 for the sub-display is located at the front of the sub-display 13. A width of the opening 172 for the lens cover meets the width of the lens cover 16. A length of the opening 172 for the lens cover meets the length of the sliding area of the lens cover 16. The lens cover 16 is subjected to the sliding operation in the opening 172. In the shutting state of the lens cover 16 shown in FIG. 3, an upper edge 16a of the lens cover 16 is in contact with an upper edge 172a of the opening 172. In the opening state of the lens cover 16 shown in FIG. 4, a lower edge 16b of the lens cover 16 is in contact with a lower edge 172b of the opening 172.

Figure 6:
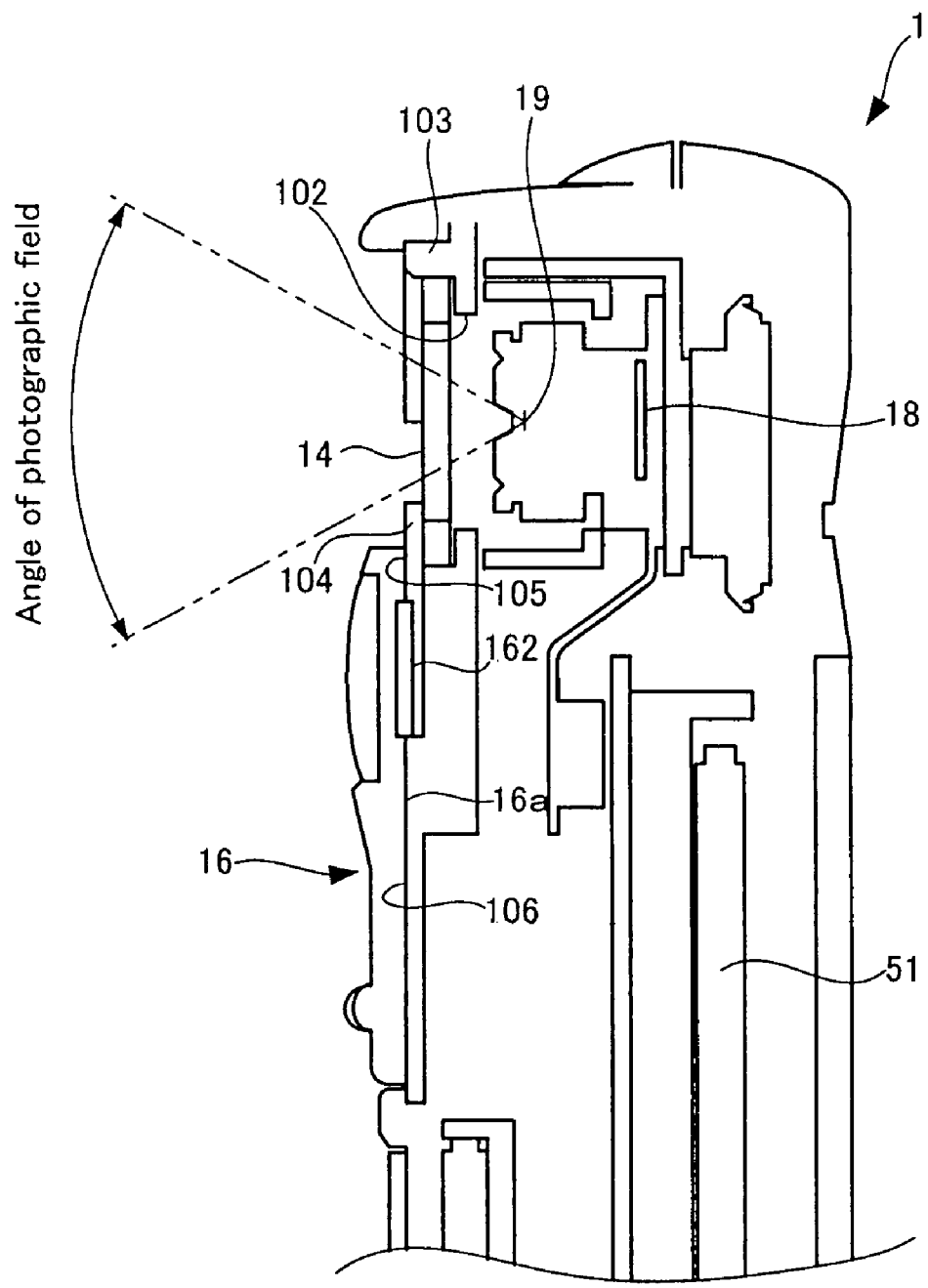
FIG. 6 is a cross-sectional view showing a cross section of the display side as to the line A-A of FIG. 4.

Here there will be continued the explanation in conjunction with FIG. 6.

FIG. 6 is a cross-sectional view showing a cross section of the display side as to the line A-A of FIG. 4.

FIG. 6 shows a solid state imaging device 18 and a photographic lens 19, which were omitted in illustration in the previous figures. Two-dot chain line shown in FIG. 6 denotes an angle of photographic field of the photographic lens 19.

The rear case 10 shown in FIG. 5 is provided with an aperture 102 in which the photographic lens 19 shown in FIG. 6 is disposed, in addition to the apertures 12 through which the terminating sound emanate. Further, along the upper half periphery of the aperture 102, there is provided a semicircular rib 103. The rear case 10 is further provided with a pair of ribs 104 extending downward mutually keeping a predetermined interval, below the aperture 102.

The camera panel 14 is made of high permeability of acrylate resin and is slightly larger than the apertures 12. The camera panel 14 is stuck onto the rear case surface 100 to cover the aperture 102.

A static eliminating member 162 shown in FIG. 5 is stuck onto the back of the lens cover 16. An arrow indicated by a dotted line shown in FIG. 5 represents that the static eliminating member 162 is stuck onto the rear case 10. The acrylate resin, which is the material of the camera panel 14, offers a high surface resistivity value on the order of $10^{16}\Omega$, and thus it is easy to charge. As a result, it is easy that dust stick to a surface of the camera panel 14. The static eliminating member 162 is located against the camera panel 14 in the state that the lens cover 16 is closed, and is in non-contact with the camera panel 14. FIG. 6 shows a state that the static eliminating member 162 is in non-contact with a portion 105 put between the pair of ribs 104. A height of the portion 105 is harmonized with the same as a height of the surface of the camera panel 14. Therefore, even if the lens cover 16 offers the closed state as shown in FIG. 3, the static eliminating member 162 is in non-contact with the camera panel 14. The static eliminating member 162 is made of non-woven material of an active conductive resin fiber. However, it is not restricted to such a material, and it is acceptable that the static eliminating member 162 is made of, for example, a carbon fiber and an organic conductive fiber in which copper sulfide is subjected to chemical bonding with acrylic fiber or nylon fiber. The static eliminating member 162 discharges the camera panel 14 by means of locating against the camera panel 14, so that the surface resistivity value of the camera panel 14 is lowered to the order of $10^{11}\Omega$. Thus, it is possible to prevent dust from sticking to the camera panel 14. The static eliminating member 162 shown in FIG. 5 has a function of adsorbing dust. Even in the event that dust sticks to the camera panel 14 for some reason or other, the static eliminating member 162 adsorbs the stuck dust to remove the dust from the camera panel 14. Accordingly, when the lens cover 16 is opened, the camera panel 14 is always cleaned. Thus, there is no need to perform works for cleaning of a stain on the camera panel 14 before start of photographic operation, and thereby improving operability.

By the way, instead of provision of the static eliminating member 162, it is considered that antistatic coat is applied to a surface of the camera panel 14. However, the antistatic coat is low in hardness and thus easy to be injured. For this reason, provision of the static eliminating member 162 is more preferable as compared with applying of the antistatic coat.

It is not always necessary that the static eliminating member 162 is in non-contact with the camera panel 14, and it is acceptable that the static eliminating member 162 is in contact with the camera panel 14. In the event that the static eliminating member 162 is in contact with the camera panel 14, it is effective that brush and the like, of which the base is made of stainless steel and the top is made of acrylic resin, are used as the static eliminating member. And it is preferable to provide an arrangement for ensuring an area that the static eliminating member can sufficiently slide on the camera panel 14 in accordance with the sliding operation of the lens cover 16.

The static eliminating member 162 shown in FIG. 5 is disposed at the back of the lens cover 16 on a surface of which the mirror 15 for oneself photography is provided. The static eliminating member is also applicable to a portable terminal having a lens cover on a surface of which no mirror for oneself photography is provided.

The rear case 10 is provided with a pair of projections 101 and a sliding-contact section 106. The projections 101 in pair stand, as shown in FIG. 5, at the outsides of the ribs 104 in pair, respectively. The sliding-contact section 106 is higher than a portion 105 put between the ribs 104 in pair, as shown in FIG. 6, and is in contact with a portion 16a located below the position at which the static eliminating member 162 is provided, of the back of the lens cover 16. When the lens cover 16 is subjected to the sliding operation, the portion 16a slides on the sliding-contact section 106.

Next, there will be explained a structure for mounting the lens cover 16 again in conjunction with FIG. 5.

At both sides of the lens cover 16, there are provided engagement pieces 163, respectively. Each of the engagement pieces 163 has a groove 1631 of which a section is of a V-shaped configuration. On both the sides of the semicircular rib 103 of the rear case 10 there are provided first accommodating sections 107. On both the sides of the sliding-contact section 106 of the rear case 10 there are provided second accommodating sections 108.

On the right and the left of the rear case surface 100 there are provided torsion springs 20 shown in FIG. 5, respectively. The torsion spring 20 is a ring-shaped spring wound in the center and having a first projecting section 201 at one end thereof and a second projecting section 202 at another end. The torsion spring 20 is mounted on the rear case surface 100 in such a manner that the ring-shaped portion of the center is inserted into the projection 101 provided on the rear case 10, so that one end of the torsion spring 20 is accommodated into the first accommodating section 107 on a floating basis and another end of the torsion spring 20 is accommodated into the second accommodating section 108 on a floating basis.

Figure 7:
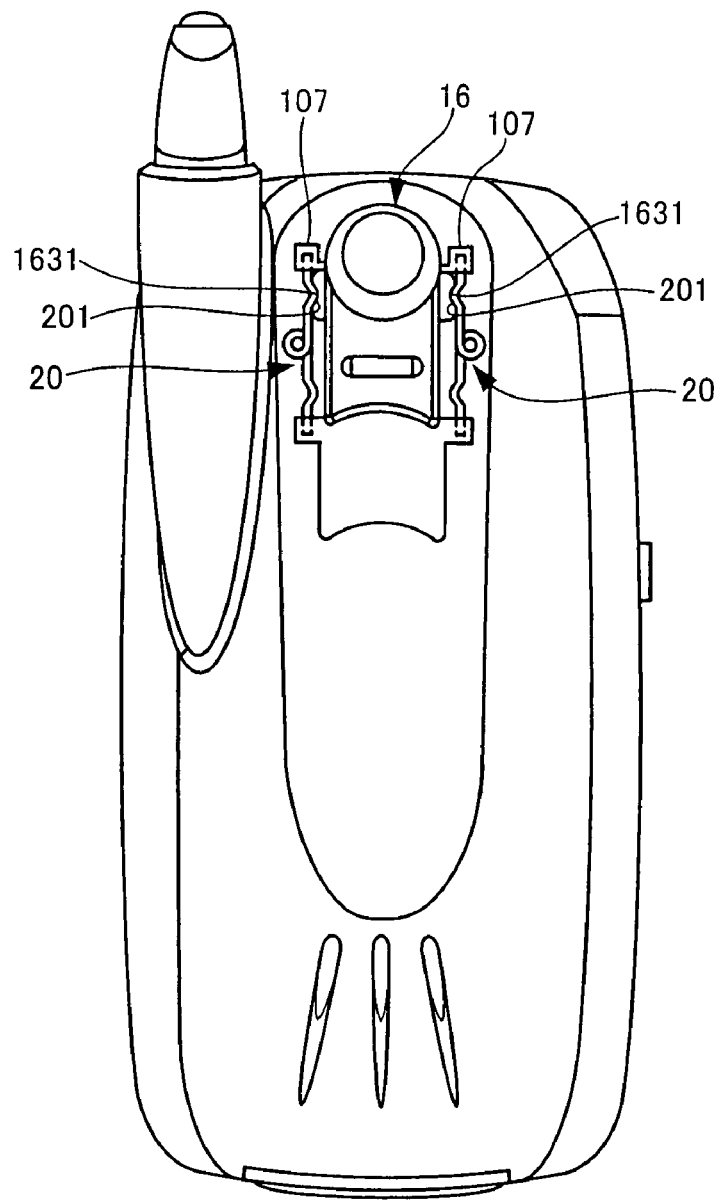
FIG. 7 is a view showing the portable telephone shown in FIG. 3 in a state that a rear panel is removed therefrom.
Figure 8:
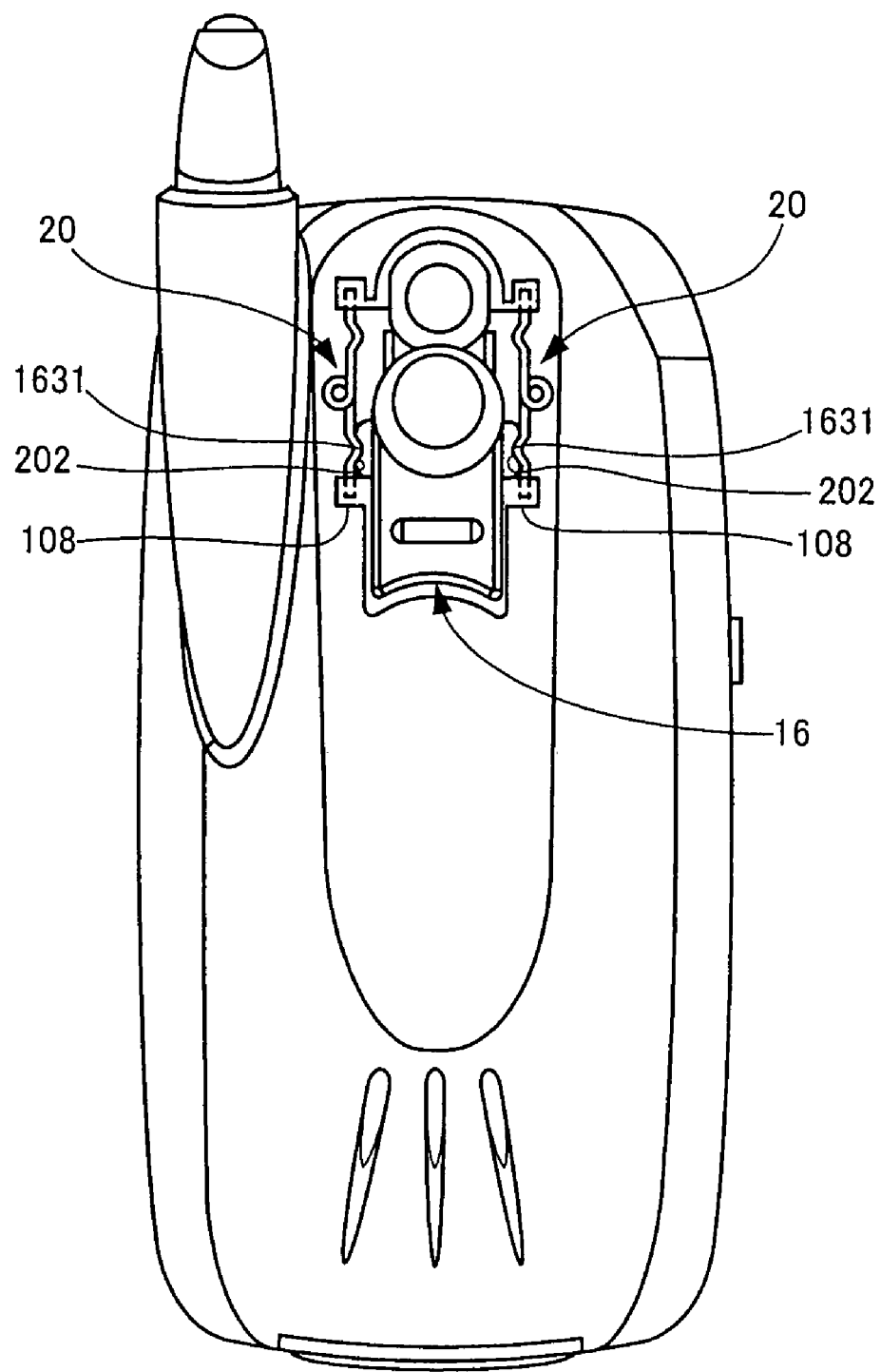
FIG. 8 is a view showing the portable telephone shown in FIG. 4 in a state that a rear panel is removed therefrom.

Here, there will be continued the explanation in conjunction with FIG. 5 and FIGS. 7 and 8 as well.

FIG. 7 is a view showing the portable telephone shown in FIG. 3 in a state that a rear panel is removed therefrom. FIG. 8 is a view showing the portable telephone shown in FIG. 4 in a state that a rear panel is removed therefrom.

FIG. 7 shows a state that the lens cover 16 is closed, wherein the groove 1631 of the lens cover 16 is engaged with the first projecting section 201 of the torsion spring 20. When the groove 1631 of the lens cover 16 is engaged with the first projecting section 201, the lens cover 16 is fixed to a state that it is closed. On the other hand, FIG. 8 shows a state that the lens cover 16 is opened, wherein the groove 1631 of the lens cover 16 is engaged with the second projecting section 202 of the torsion spring 20. When the groove 1631 of the lens cover 16 is engaged with the second projecting section 202, the lens cover 16 is fixed to a state that it is opened. When an operator starts the sliding operation for the lens cover to open the lens cover 16 in the closed state shown in FIG. 7, first, the first projecting section 201 of the torsion spring 20 is pushed outside by an upper slope 1631a (cf. FIG. 5) forming the groove 1631 of the lens cover 16, so that the one end of the torsion spring 20, which is accommodated into the first accommodating section 107 on a floating basis, travels toward the outside and the upper slope 1631a goes over the first projecting section 201.

When the lens cover 16 approaches the opened state shown in FIG. 8, then the second projecting section 202 of the torsion spring 20 is pushed outside by a lower edge 163a (cf. FIG. 5) of the engagement piece 163 of the lens cover 16, so that the another end of the torsion spring 20, which is accommodated into the second accommodating section 108 on a floating basis, travels toward the outside and the lower edge 163a of the engagement piece 163 goes over the second projecting section 202 and whereby the groove 1631 of the lens cover 16 is engaged with the second projecting section 202 of the torsion spring 20. When the groove 1631 of the lens cover 16 is engaged with the first projecting section 201 and the second projecting section 202, an operator will come to get a feeling for their engagement, and thus the operator can feel the lens cover 16 being fixed.

Next, there will be explained a modified embodiment of the portable telephone 1 shown in FIG. 2. In the modified embodiment, there will be explained different points from the portable telephone 1 shown in FIG. 2 and redundant explanation will be omitted. In the following figures, the same parts are denoted by the same reference numbers as those of FIG. 2.

The portable telephone according to the present modified embodiment has a zoom shot function. In this portable telephone, a zoom magnification wherein the zoom shot function turns on is twice.

Figure 9:
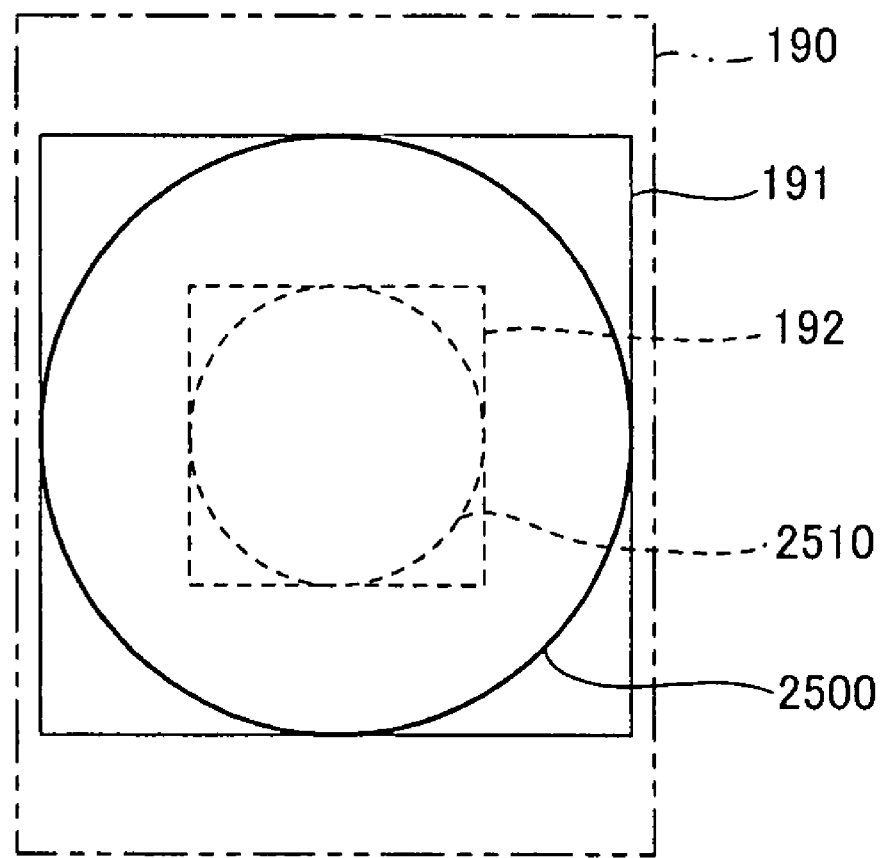
FIG. 9 is a view showing a relation between an angle of photographic field of a photographic lens provided on a portable telephone in the modified embodiment and a photographic range.

FIG. 9 is a view showing a relation between an angle of photographic field of a photographic lens provided on a portable telephone in the modified embodiment and a photographic range.

FIG. 9 shows three squares 190, 191 and 192. Each of the squares 190, 191 and 192 represents a photographic range where a camera provided on the portable telephone in the modified embodiment is used to take a photograph of a camera subject spaced with a predetermined distance. Of those squares 190, 191 and 192, the square 190 indicated by the two-dot chain line represents a photographic range defined by an angle of photographic field of the photographic lens 19 and forms an area of horizontal 296 dots×vertical 370 dots on the main display 51. The square 191 indicated by the solid line represents a photographic range wherein a photography is taken when a zoom photographic function is turned off and forms an area of horizontal 288 dots×vertical 288 dots on the main display 51. The square 192 indicated by the dotted line represents a photographic range wherein a photography is taken when a zoom photographic function is turned on and forms an area of horizontal 144 dots×vertical 144 dots on the main display 51. While taking a photograph wherein the zoom photographic function is turned on may actually take in once an image of the area represented by the square 191 indicated by the solid line, and cuts out an image of the area represented by the square 192 indicated by the dotted line, here, for the sake of convenience, the area represented by the square 192 indicated by the dotted line is referred to as the photographic range wherein a photography is taken when a zoom photographic function is turned on. When a photograph, wherein photography is taken when a zoom photographic function is turned on, is displayed on the main display 51, an image on the area represented by the square 192 indicated by the dotted line is displayed with an enlargement to the area of the square 191 indicated by the solid line. That is, the image on the area represented by the square 192 indicated by the dotted line is displayed with a twice enlargement. Thus, switching of turn-on and turn-off of the zoom function makes it possible that the photographic range or the angle of photographic field changes over.

Here, there will be explained a mirror for oneself photography provided on a portable telephone in the modified embodiment together with FIG. 9 and FIG. 10(a) and FIG. 10(b) as well.

FIG. 10(a) and FIG. 10(b) are views each showing a mirror for oneself photography provided on a portable telephone in the modified embodiment.

A surface of the lens cover 16 provided on a portable telephone in the modified embodiment is provided with a mirror 25 for oneself photography shown in FIG. 10(a) and FIG. 10(b). The mirror 25 is of a round shape and is different in curvature between the surface of an inside portion 251 and the surface of an outside portion 252.

Figure 10:
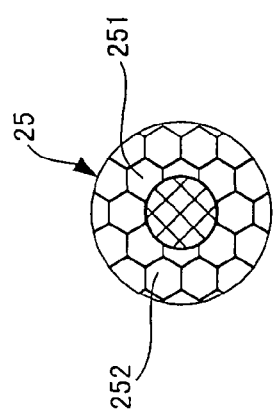
FIG. 10(a) and FIG. 10(b) are views each showing a mirror for oneself photography provided on a portable telephone in the modified embodiment.
Figure 10:
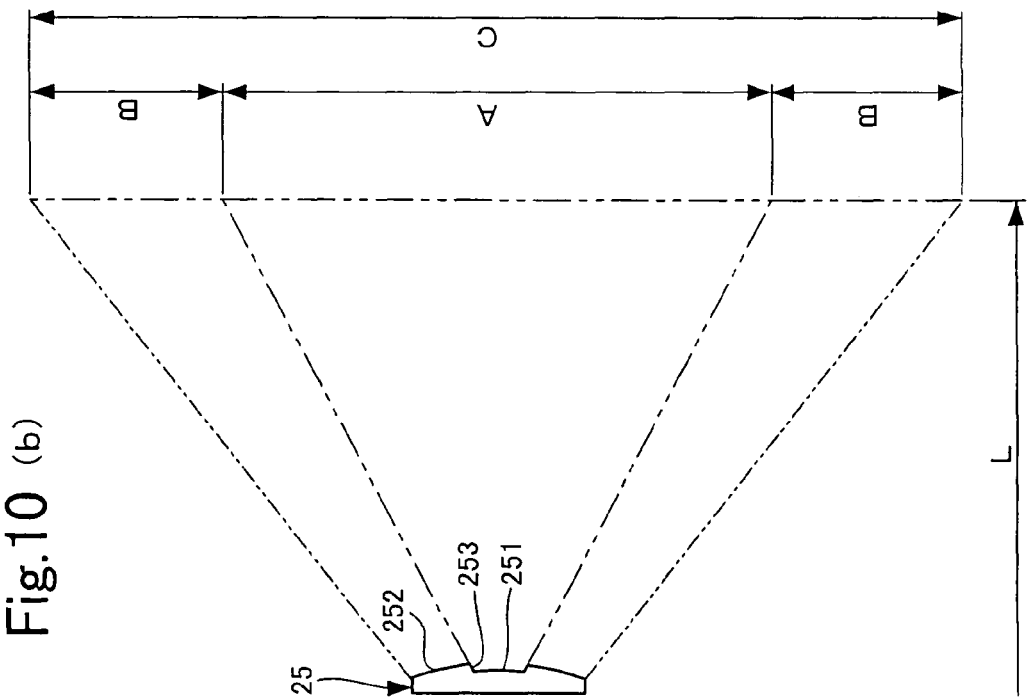

FIG. 10(a) is a front view of the mirror 25 for oneself photography provided on the portable telephone in the modified embodiment. In FIG. 10(a), the inside portion 251 is shaped as a lattice, and the outside portion 252 is shaped as a honey-com, whereby it is indicated that the mirror 25 is different in curvature between the surface of the inside portion 251 and the surface of the outside portion 252. FIG. 10(b) is a view showing an area to be reflected by the mirror 25 shown in FIG. 10(a). FIG. 10(b) shows a side view of the mirror 25. A curvature radius of an inside portion surface of the mirror 25 shown in FIG. 10 is smaller than that of an outside portion surface of the mirror 25. In other words, in the mirror 25, the surface of the inside portion 251 is larger in curvature than the surface of the outside portion 252. Thus, when a camera subject, which is spaced by a predetermined distance L, is reflected, the outside portion 252, as shown in FIG. 10(b), reflects an area B surrounding an area A reflected by the inside portion 251. This will be explained in conjunction with the relation with the photographic range using FIG. 9. When a user takes a picture of one's own face spaced by a predetermined distance, the inside portion 251 of the mirror 25 reflects the area represented by a circle 2510 indicated by the dotted line shown in FIG. 9. In view of the fact that the circle 2510 indicated by the dotted line is an inscribed circle of the square 192 indicated by the dotted line, it would be understood that the area A reflected by the inside portion 251, as shown in FIG. 10(b), corresponds to the photographic range in which a photograph of a camera subject spaced by a predetermined distance L is taken wherein the zoom photographic function is turned on. Further, an area of a combination of the inside portion 251 and the outside portion 252, that is, the whole mirror 25 shown in FIG. 10 reflects an area indicated by a circle 2500 of the solid line shown in FIG. 9, when a user takes a picture of one's own face spaced by a predetermined distance. In view of the fact that the circle 2500 indicated by the solid line is an inscribed circle of the square 191 indicated by the solid line, it would be understood that the area C reflected by the whole of the mirror 25, as shown in FIG. 10(b), corresponds to the photographic range in which a photograph of a camera subject spaced by a predetermined distance L is taken wherein the zoom photographic function is turned off.

As seen from FIG. 10(b), there is provided a difference 253 between the inside portion 251 and the outside portion 252. The inside portion 251 is lower than the outside portion 252. Accordingly, an operator can clearly distinguish the mirror reflected on the inside portion 251 from the mirror reflected on the outside portion 252. Thus, in the event that a photograph is taken wherein the zoom photographic function is turned on, it is effective that an operator confirms composition of a photograph in view of only the mirror image reflected on the inside portion 251. On the other hand, in the event that a photograph is taken wherein the zoom photographic function is turned off, it is effective that an operator confirms composition of a photograph in view of the mirror image reflected on the whole of the mirror 25. In this manner, according to the portable telephone in the modified embodiment, it is possible to reflect the suitable photographic range on the mirror 25 for oneself photograph, in both the cases of turn-on and turn-off of the zoom photographic functions, and thereby reducing the number of times of taking a photograph over again due to a failure of composition for oneself photograph. Further, it is possible for an operator to confirm the composition on the whole of a mirror and the inside portion as the part the mirror, and whereby it is easy to grasp the correlation between the different photographic ranges and thus it is satisfactory in operability.

By the way, it is considered that the mirror 25 in the modified embodiment is replaced by one in which a marking is applied to the same curvature of mirror in accordance with the photographic range. However, to apply the marking, it is obliged to increase a fabrication step. To the contrary, to change the curvature of the surface, it is possible to cope with a model for forming a mirror. For this reason, the use of the mirror 25 in the modified embodiment is more preferable since it involves no increment of the number of fabrication steps.

According to the portable telephone in the modified embodiment, there is prepared only twice zoom magnification. However, in case of a portable telephone wherein for example, twice zoom magnification and four times zoom magnification are prepared, it is acceptable that between the inside portion and the outside portion of the mirror there is provided a portion having a surface curvature which is smaller than the surface curvature of the inside portion and is larger than the surface curvature of the outside portion, and the most inner portion is provided as a portion corresponding to the photographic range of four times of zoom magnification and a portion of a combination of the center portion and the most inner portion is provided as a portion corresponding to the photographic range of twice zoom magnification. Also in this case, it is effective that the whole of the mirror corresponds to the photographic range wherein the zoom photographic function is turned off. While it is acceptable that there is provided a mirror corresponding to four or more sorts of photographic range, to provide the correspondence to four or more sorts of photographic range, it is preferable from the viewpoint of easy way to see that there is provided a plurality of mirrors corresponding to two sorts of photographic range. Further, reversely in large-small relations of the curvature, it is acceptable that the curvature of the inside portion 251 is selected to be smaller than the curvature of the outside portion 252. From the viewpoint of easy way to see, however, it is preferable that the curvature of the inside portion 251 is selected to be larger than the curvature of the outside portion 252. Technology of the present modified embodiment is applicable to a portable telephone provided with a photographic lens variable in focal length.

Next, there will be explained another modified embodiment of the portable telephone shown in FIG. 2. In the following explanation, only the points different from the portable telephone 1 shown in FIG. 2 will be explained and the redundant explanation will be omitted. In the following figures, the same parts are denoted by the same reference numbers as those of FIG. 2.

The portable telephone according to the present embodiment has a function of obtaining image data of the number of pixels corresponding to the number of photo-electric elements in a plurality of areas mutually different in number of photo-electric elements, of an image plane of the solid state imaging device 18.

Figure 11:
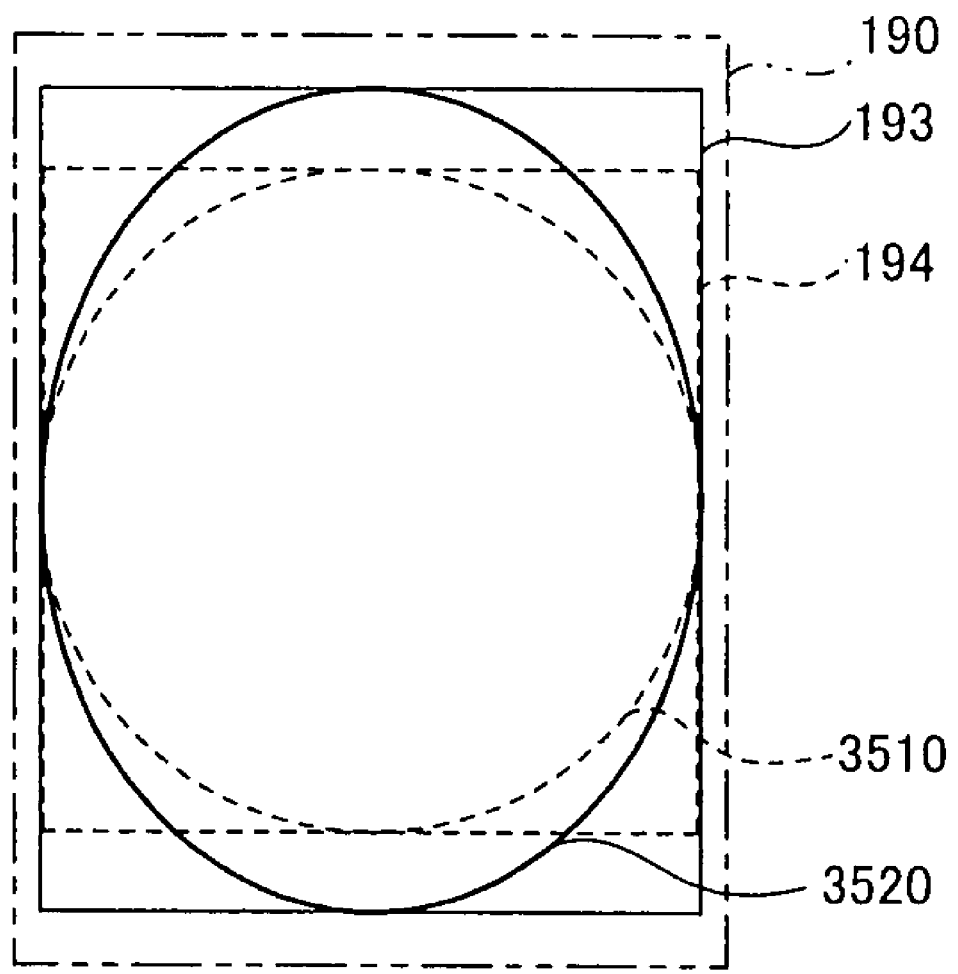
FIG. 11 is a view showing a relation between the number of pixels of image data created by a portable telephone in the modified embodiment and a photographic range.

FIG. 11 is a view showing a relation between the number of pixels of image data created by a portable telephone in the present modified embodiment and a photographic range.

FIG. 11 shows three squares 190, 193 and 194. Each of the squares 190, 193 and 194 represents a photographic range where a camera provided on the portable telephone in the present modified embodiment is used to take a photograph of a camera subject spaced with a predetermined distance. Of those squares 190, 193 and 194, the square 190 indicated by the outside two-dot chain line represents a photographic range defined by an angle of photographic field of the photographic lens 19 and forms an area of horizontal 296 dots× vertical 370 dots on the main display 51. The square 193 indicated by the solid line represents a photographic range wherein image data of the maximum number of pixels, which is capable of being created by the portable telephone in the present modified embodiment, is created and forms an area of horizontal 288 dots×vertical 352 dots on the main display 51. The square 194 indicated by the inside dotted line represents a photographic range wherein image data of the minimum number of pixels, which is capable of being created by the portable telephone in the present modified embodiment, is created and forms an area of horizontal 288 dots×vertical 288 dots on the main display 51. While creating the image data of the minimum number of pixels may actually take in once an image of the area represented by the square 193 indicated by the solid line, and cuts out an image of the area represented by the square 194 indicated by the dotted line, here, for the sake of convenience, the area represented by the square 194 indicated by the dotted line is also referred to as the photographic range. Incidentally, even if an image based on the image data of the minimum number of pixels is displayed on the main display 51, the number of pixels is kept on the minimum number of pixels, and the size of the image is kept on the size of the area indicated by the square 194 indicated by the dotted line. As explained above, as the number of pixels of image data to be created is varied, the photographic range is varied too.

Here, there will be explained a mirror for oneself photography provided on a portable telephone in the present modified embodiment together with FIG. 11 and FIG. 12 as well.

Figure 12:
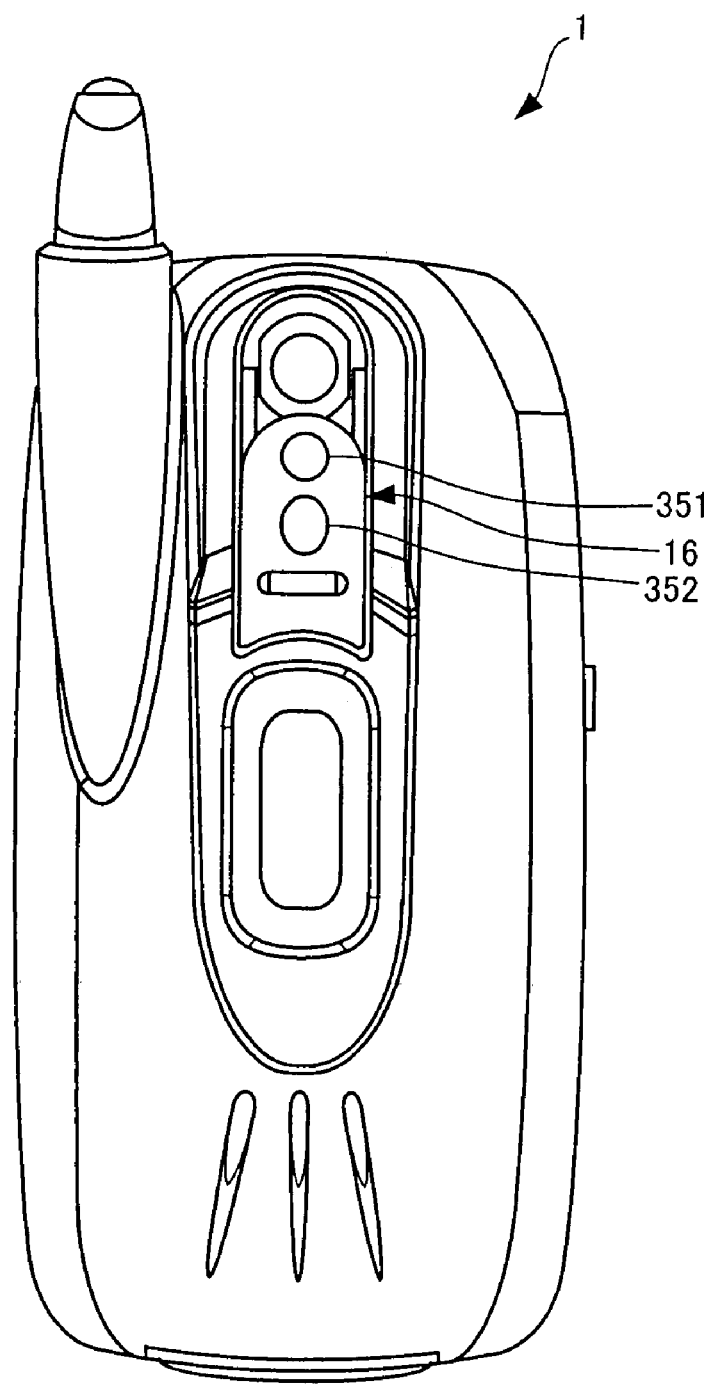
FIG. 12 is a top plan view of the portable telephone according to the modified embodiment in a state that it is folded, looking it from the top of the display side.

FIG. 12 is a top plan view of the portable telephone according to the present modified embodiment in a state that it is folded, looking it from the top of the display side.

On a surface of the lens cover 16 provided on the portable telephone 1 shown in FIG. 12, there are arranged, as mirrors for oneself photography, a circular mirror 351 for reflecting a photographic range wherein image data for the minimum number of pixels is generated, and an elliptical mirror 352 for reflecting a photographic range wherein image data for the maximum number of pixels is generated. The mirrors 351 and 352 are arranged in an up-and-down relation. The elliptical mirror 352 shown in FIG. 12 reflects an area indicated by an ellipse 3520 of the solid line shown in FIG. 11, when an operator takes a photograph of one's own face spaced by a predetermined distance. In view of the fact that the ellipse 3520 of the solid line is inscribed with the square 193 of the solid line, it would be understood that the area reflected by the elliptical mirror 352 corresponds to the photographic range wherein a photography of a camera subject spaced by a predetermined distance is taken, to generate image data of the minimum number of pixels. The circular mirror 351 shown in FIG. 12 reflects an area indicated by a circle 3510 of the dotted line shown in FIG. 11, when an operator takes a photograph of one's own face spaced by a predetermined distance. In view of the fact that the circle 3510 of the dotted line is inscribed with the square 194 of the dotted line, it would be understood that the area reflected by the circular mirror 351 corresponds to the photographic range wherein a photography of a camera subject spaced by a predetermined distance is taken, to generate image data of the maximum number of pixels. Therefore, even if the number of pixels for the imager data to be generated is varied, it is possible to reflect the suitable photographic range on the mirror for oneself photograph, and thereby reducing the number of times of taking a photograph over again due to a failure of composition for oneself photograph. It is preferable that an indication to discriminate a use for the respective mirror is applied to the periphery of each of the mirrors 351 and 352.

According to the above-mentioned two modified embodiments, the mirror 25 for oneself photography shown in FIG. 10 and the mirrors 351 and 352 shown in FIG. 12 are disposed on the surface of the lens cover 16 of which the back the static eliminating member 162 is provided on. However, those mirrors 25, 351 and 352 are widely applicable to a portable telephone not provided with the static eliminating member 162.

Next, there will be explained a portable telephone according to the second embodiment of the present invention. The portable telephone according to the second embodiment is the same as the portable telephone 1 shown in FIG. 2 excepting a point that the static eliminating member 162 shown in FIG. 5 is replaced by a wiping up member. And thus the redundant explanation is omitted and there will be explained only the wiping up member using the same reference numbers.

Figure 13:
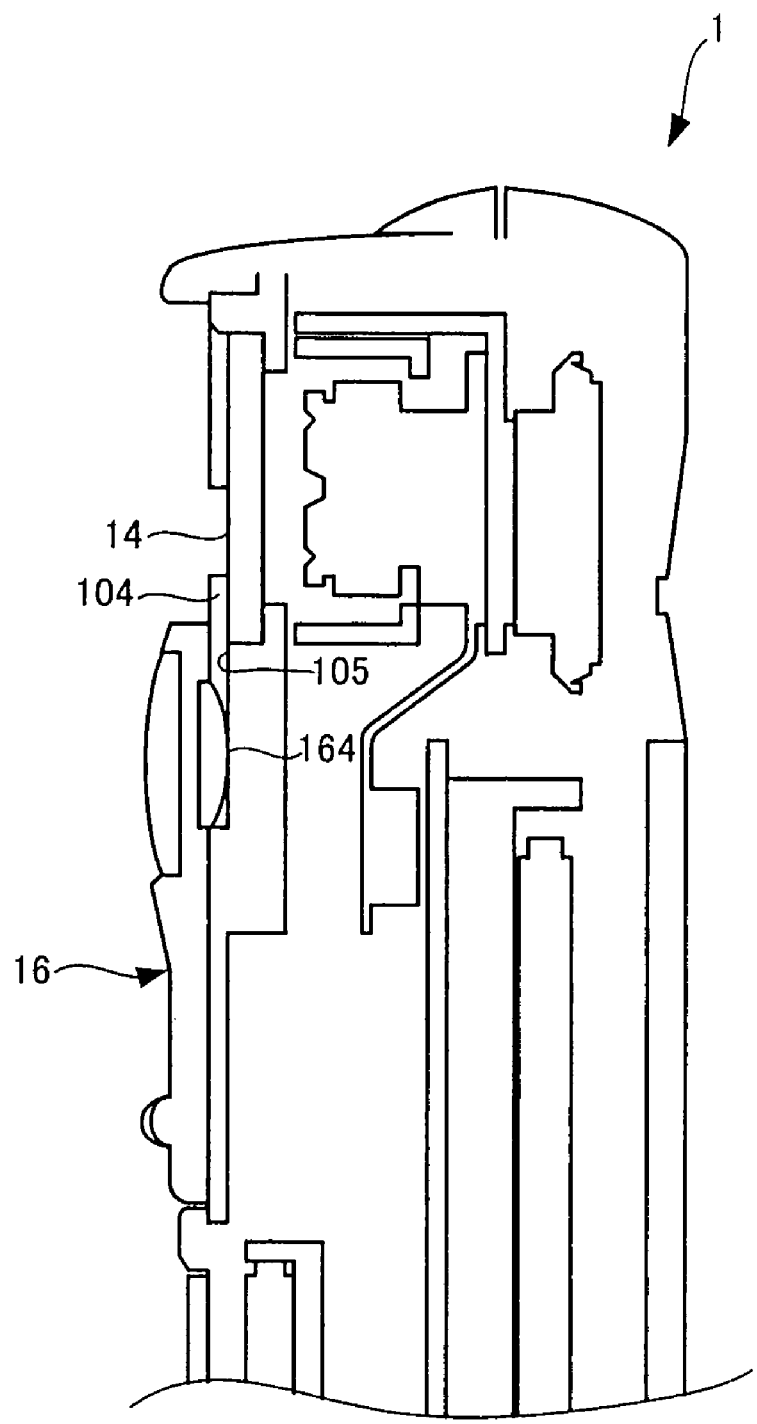
FIG. 13 is a cross-sectional view showing a cross section of the display side in which the portable telephone according to the second embodiment is sectioned in a similar fashion to that of the portable telephone shown in FIG. 6.

FIG. 13 is a cross-sectional view showing a cross section of the display side in which the portable telephone according to the second embodiment is sectioned in a similar fashion to that of the portable telephone shown in FIG. 6.

On the back of the lens cover 16 provided on the portable telephone 1 shown in FIG. 13 there is provided a wiping up member 164. The wiping up member 164 shown in FIG. 13 is a non-woven cloth of a non-transitional property in which characteristics (color and the like) of the material are not shifted to the camera panel 14. According to the embodiment show in FIG. 13, the wiping up member 164 is in contact with a portion 105 interposed between a pair of ribs 104 on a pressure basis. Thus, when the lens cover 16 is closed, the wiping up member 164 is in contact with the camera panel 14 on a pressure basis, so that the wiping up member 164 wipes up a stain stuck to the camera panel 14. Further, also in the event that a state of the lens cover 16 is shifted from the closed state to the opened state, the wiping up member 164 wipes up a stain stuck to the camera panel 14. Therefore, when the lens cover 16 is opened, the camera panel 14 is always in a state that it is cleaned. Thus, there is no need to perform a work of wiping up a stain of the camera panel 14 prior to starting the photographic operation, and thereby improving operability. While the wiping up member 164 is not restricted to the non-woven cloth, it is preferable that the wiping up member 164 has elasticity. By way of example, there is raised one in which a material having elasticity is interposed between materials of non-elasticity. Further there is raised, by way of example of more preferable one, another one made of elastic material of non-transitional property, which has a static eliminating effect. It is acceptable that the wiping up member 164 is of a brush-like configuration.

While the wiping up member 164 shown in FIG. 13 is provided on the back of the lens cover 16 of which on the surface the mirror 15 for oneself photography is provided, the wiping up member is applicable to a portable terminal having a lens cover of which on the surface no mirror for oneself photography is provided.

While the present invention is explained raising a portable telephone by way of example, a portable terminal of the present invention is applicable to a portable terminal other than the portable telephone, for example, a pocketbook size of information equipment provided with a touch panel, which is referred to as a so-called portable information terminal. In such a portable terminal other than the portable telephone, there is no need that the mirror 15 is always for oneself photography.

According to the present invention, it is possible to provide a portable terminal having a photographic function improved in operability, and a portable telephone having a photographic function improved in operability.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A portable terminal having a photographic function for receiving photographic light from a camera subject and obtaining image data, said portable terminal comprising:

an optical member receiving photographic light from the camera subject; and a cover member mounted on a slidable basis, said cover member selectively opening and shutting to cover said optical member in accordance with a sliding operation, wherein said cover member has a static eliminating member which is in non-contact with said optical member, and which faces said optical member when said cover member is shut, wherein said portable terminal further comprises a main display, and wherein the optical member and the cover member are both disposed on a surface of the portable terminal which is opposite a surface where said main display is disposed.

2. A portable telephone having a photographic function for receiving photographic light from a camera subject and obtaining image data, said portable telephone comprising:

an optical member receiving photographic light from the camera subject; and a cover member mounted on a slidable basis, said cover member selectively opening and shutting to cover said optical member in accordance with a sliding operation, wherein said cover member has a static eliminating member which is in non-contact with said optical member, and which faces said optical member when said cover member is shut, wherein said portable telephone further comprises a main display, and wherein the optical member and the cover member are both disposed on a surface of the portable terminal which is opposite a surface where said main display is disposed.

* * * * *